Aug. 19, 1958  C. ALLANDER ET AL  2,848,066
DEVICE FOR A SIMULTANEOUS CLEANSING OF THE OUTLETS
FOR DUST AND CLEAN-GAS IN CYCLONES
Filed Sept. 26, 1956
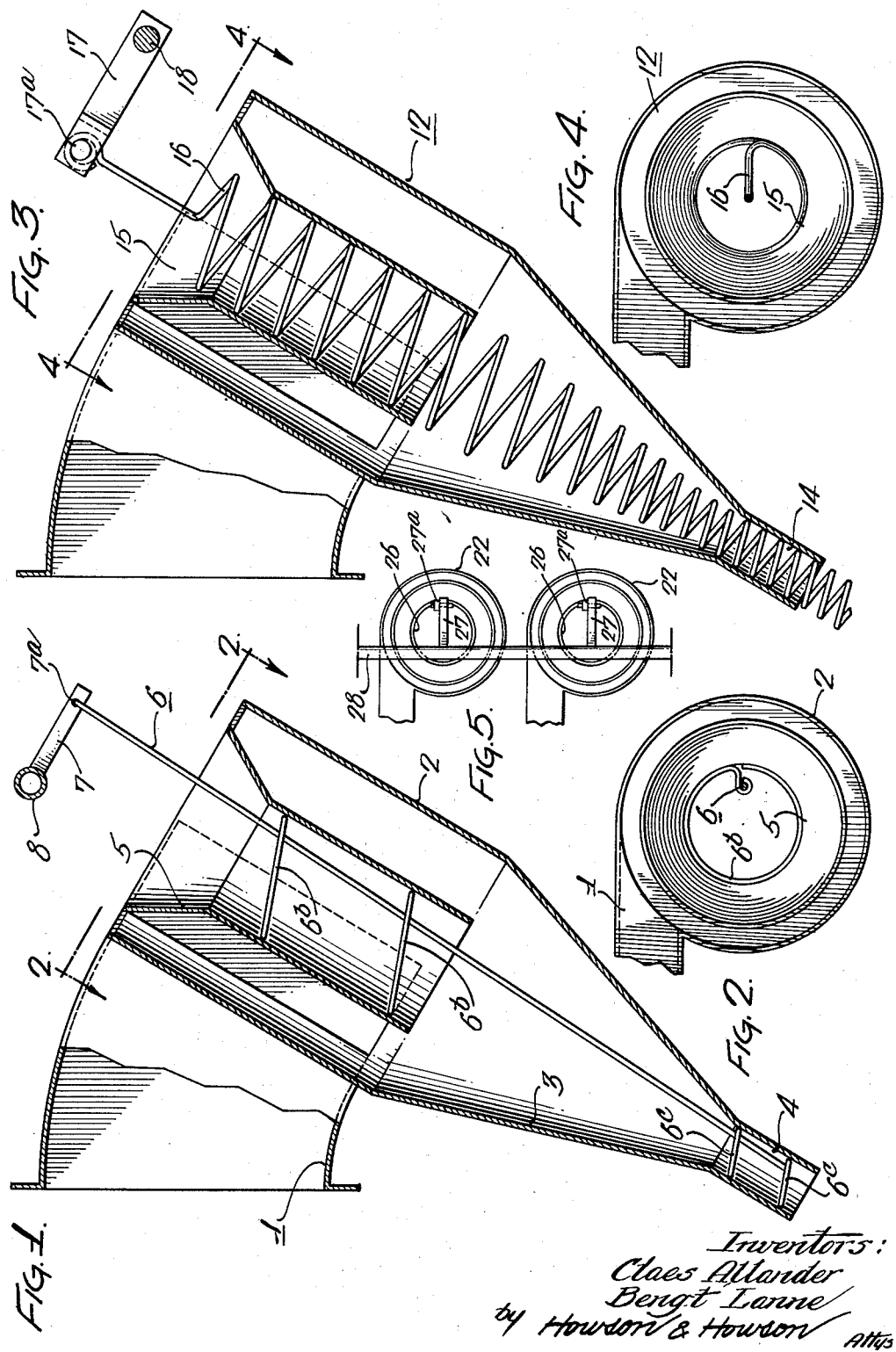
Inventors:
Claes Allander
Bengt Lanne
by Howson & Howson Attys

2,848,066
DEVICE FOR A SIMULTANEOUS CLEANSING OF THE OUTLETS FOR DUST AND CLEAN-GAS IN CYCLONES

Claes Allander, Sodra Angby, and Bengt Lanne, Johanneshov, Sweden, assignors to Aktiebolaget Svenska Flaktfabriken, Stockholm, Sweden Application September 26, 1956, Serial No. 612,294

Claims priority, application Sweden September 28, 1955

5 Claims. (Cl. 183—76)

The present invention relates to a device for a simultaneous cleansing of the outlets for dust and for clean-gas in cyclones, preferably parallel-working cyclones with small dimensions, which cyclones in a manner known per se are equipped with an outlet tube for dust in the lower conical part of the cyclone and an outlet for clean-gas in the shape of a central tube in the upper part of the cyclone. In cyclones being used for the cleaning of gases commingled with fine dust particles or greasy and sticky dust, a clogging of the dust outlet will easily occur, the function of the cyclone thus being disturbed. For eliminating these drawbacks cleansing devices in form of hammering means, vibrators or the like have earlier been used. Such known devices are however not suitable for use in small cyclones, where there also is a risk for clogging of the clean-gas outlet in view of the fact that such cyclones often are used for separating very fine dust. It is an object of the invention to provide a simple and effective device for a simultaneous cleansing of the outlets for dust and for clean-gas in such cyclones.

The invention is mainly characterized by a member movably suspended at a certain distance above the clean-gas outlet of the cyclone and extending through both the outlet for the clean-gas and the outlet for the dust and with its lower, free end projecting somewhat outside said outlet for dust, which member is equipped with annular-shaped scraping means resting against the inner side of said outlet tubes for clean-gas and dust respectively, which scraping means will remove dust being accumulated on the surfaces of said tubes, while an up and downward movement is imparted to the member. Other characteristics will be evident from the following description and accompanying drawings.

The invention will now be described more in detail with reference to the accompanying drawings, wherein—

Fig. 1 shows in section a cyclone provided with a cleansing device according to the invention;

Fig. 2 is a sectional view taken on the line 2—2 of Fig. 1;

Fig. 3 is a view in section similar to Fig. 1 showing a modified embodiment embodiment of the present invention;

Fig. 4 is a sectional view taken on the line 4—4 of Fig. 3; and

Fig. 5 is a thumbnail sketch in plan of a plurality of cyclones embodying cleansing means in accordance with the present invention.

In the drawings, and more particularly in Figs. 1 and 2, reference number 1 designates the tangential inlet for the raw-gas. The parts of the cyclone are designated 2, 3 and 4 and relate to the cylindrical part, the conical part and the dust outlet of the cyclone respectively. 5 designates the clean-gas outlet of the cyclone in shape of a so-called central tube. 6 designates a cleansing member movably suspended at a certain distance above the clean-gas outlet of the cyclone. Said member is supported in the lever 7 at the point 7a and is influenced by an axle 8, by means of which an up and downward movement can be imparted to the member. In Fig. 1 the designation 6b stands for annular-shaped scraping means intended to maintain the clean-gas outlet free from dust accumulations. In the same manner 6c designate annular-shaped scraping means intended to cleanse the dust outlet.

In the embodiment shown in Figs. 3 and 4 the member consists of a spirally wound wire 16, the winding direction of which coincides with the rotation direction of the gas current in the cyclone 12. The winding of the spiral should coincide as well as possible with the pitch of the gas spiral in the outlet part of the cyclone. By this embodiment the separation capacity of the cyclone will be increased as compared with a cyclone lacking such a spiral. In the embodiment shown the spirally wound wire is made with a diameter decreasing by steps to correspond to the dimensions of the outlet tubes 14 and 15 of the cyclone 12, suitably with a conical part as a transition between the steps. The member 16 is supported by a lever 17 as indicated at 17a and is actuated by an axle 18.

In Fig. 5, two cyclones 22, 22 working in parallel are provided with members 26, 26 which may be similar in construction to either one of the members 6 and 16. Each member 26 is supported by a lever 27 as indicated at 27a, and the two members 26 are operated in unison by means of a common axle 28.

What we claim is:

1. In a cyclone having a downwardly tapering conical section terminating in a cylindrical dust outlet tube, and a cylindrical clean-gas outlet tube in the upper portion of said cyclone coaxial with said dust outlet tube, a device for simultaneously cleaning said dust and clean-gas outlet tubes comprising an elongated member extending axially through said dust and clean-gas outlet tubes and having a plurality of substantially annular scraper elements axially movable in said dust and clean-gas outlets, the scraper elements in each outlet having a generally circular outline corresponding in diameter to the inner diameter of the associated outlet to thereby scrape the walls of said dust and clean-gas outlets upon axial movement of said elongated member.

2. A device according to claim 1 wherein said elongated member comprises a straight rod having a plurality of downwardly directed wire rings constituting said generally annular scraper elements.

3. A device according to claim 1 wherein said elongated member comprises a spirally wound wire, the convolutions of which constitute said generally annular scraper elements.

4. A device according to claim 3 wherein said cyclone includes a tangential dirty-gas inlet in the upper portion thereof for directing the gas in a downwardly spiralling path, and wherein further the direction of winding of said spirally wound wire coincides with the direction of said gas path.

5. A device according to claim 1 wherein a plurality of cyclones are connected in parallel and the elongated member in each cyclone is suspended from a separate lever, and including a common axle mounting said levers for pivotal movement to displace the elongated members axially within the associated cyclones.

References Cited in the file of this patent

UNITED STATES PATENTS

| | | |
|---|---|---|
| 2,438,827 | Shoffner | Mar. 30, 1948 |
| 2,521,380 | Lichtenfels | Sept. 5, 1950 |

FOREIGN PATENTS

| | | |
|---|---|---|
| 739,504 | Great Britain | Nov. 2, 1955 |